US008463547B2

(12) United States Patent
Bakulin et al.

(10) Patent No.: US 8,463,547 B2
(45) Date of Patent: Jun. 11, 2013

(54) METHOD OF CORRECTING AMPLITUDES IN VIRTUAL SOURCE IMAGING OF SEISMIC DATA

(75) Inventors: Andrey Victorovich Bakulin, Dhahran (SA); Joost Van Der Neut, Delft (NL)

(73) Assignee: Shell Oil Company, Houston, TX (US)

( * ) Notice: Subject to any disclaimer, the term of this patent is extended or adjusted under 35 U.S.C. 154(b) by 377 days.

(21) Appl. No.: 12/812,076

(22) PCT Filed: Jan. 9, 2009

(86) PCT No.: PCT/US2009/030552
§ 371 (c)(1),
(2), (4) Date: Sep. 9, 2010

(87) PCT Pub. No.: WO2009/089418
PCT Pub. Date: Jul. 16, 2009

(65) Prior Publication Data
US 2011/0130967 A1 Jun. 2, 2011

Related U.S. Application Data

(60) Provisional application No. 61/010,897, filed on Jan. 11, 2008.

(51) Int. Cl.
*G01V 1/40* (2006.01)
(52) U.S. Cl.
USPC ............................................................ 702/6
(58) Field of Classification Search
USPC .................................................... 702/6–18
See application file for complete search history.

(56) References Cited

U.S. PATENT DOCUMENTS

| 5,742,560 | A | 4/1998 | Krebs | 367/57 |
| 6,747,915 | B2 | 6/2004 | Calvert | 367/46 |
| 6,788,619 | B2 | 9/2004 | Calvert | 367/61 |
| 6,906,982 | B2 | 6/2005 | Calvert | 367/21 |
| 7,046,581 | B2 | 5/2006 | Calvert | 367/57 |
| 2007/0195643 | A1 | 8/2007 | Bakulin et al. | 367/38 |
| 2008/0080308 | A1 | 4/2008 | Hornby | 367/15 |
| 2010/0139927 | A1 | 6/2010 | Bakulin et al. | 166/369 |

FOREIGN PATENT DOCUMENTS

| WO | WO03023450 | 3/2003 |
| WO | WO2008064100 | 5/2008 |

OTHER PUBLICATIONS

Mehta K, et al: Improving the virtual source method by wavefield separation, Geophysics Society of Exploration Geophysicists USA, vol. 72, No. 4, Jul. 2007, pp. 79-86.

(Continued)

*Primary Examiner* — Stephen Cherry

(57) ABSTRACT

A method for imaging a subsurface formation using at least two seismic sources and receivers includes: a) creating a wave field in the formation, b) obtaining a set of responses for each receiver and performing wave field separation on them, c) obtaining a virtual source signal for at least a first receiver k by cross-correlating at least part of the response of a second receiver m with at least part of the response of the first receiver k and summing the cross-correlated responses from the sources, making receiver k a virtual source, d) for each virtual source, estimating an amplitude radiation pattern by performing a transform of the response data, e) deconvolving at least one virtual source signal with at least part of the estimated radiation pattern for that receiver to produce an amplitude-corrected virtual source signal, and f) using that signal to create an image of the subsurface formation.

19 Claims, 7 Drawing Sheets

Geometry (including P- and S-wave velocities) of the Fahud 1D elastic model.

OTHER PUBLICATIONS

Bakulin A, et al: The virtual source method: theory and case study, Geophysics, Society of Exploration Geophysicists USA, vol. 71, No. 4, Jul. 1, 2006, pp. SI139-SI150.

Snieder R, et al: Equivalence of the virtual-source method and wave-field deconvolution in seismic interferometry, Physical Review E (Statistical, Nonlinear, and Soft Matter Physics), American Physical Society, College Park, MD, US, vol. 73, No. 6, Jun. 23, 2006, pp. 66620-66621.

A. Bakulin, A. Mateeva, K. Mehta, P. Jorgensen, J. Ferrandis, I. Sinha Herhold and J. Lopez; "Virtual source applications to imaging and reservoir monitoring," *The Leading Edge*; v. 26; No. 6; p. 732-740; (Jun. 2007).

Kiyashchenko, R. E. Plessix, B. Kashtan, and V. Troyan, "A modified imaging principle for true-amplitude wave-equation migration," *Geophysical Journal International*; 168(3) pp. 1093-1104 (Mar. 2007).

Bakulin, A. et al, "The Virtual Source Method: Theory and Case Study", Geophysics Society of Exploration, vol. 71, No. 4, Jul. 2006; pp. SI139-SI150, XP002517803.

Mehta, K. et al, "Improving the Virtual Source Method by Wavefield Sparation", Geophysics Society of Exploration, vol. 72, No. 4, Jul. 2007; pp. 79-86.

Snieder, R. et al, "Equivalence of the Virtual-Source Method and Wave-Field Deconvolution in Seismic Interferometry", Am. Phy. Society, vol. 73, No. 6, Jun. 2006; pp. 66620-66621.

Geometry (including P- and S-wave velocities) of the Fahud 1D elastic model.

Desired Virtual Source amplitude radiation pattern $\left|\tilde{D}^d(k_1, x_3, \omega)\right|$ Maximum radiation aperture of the steered Virtual Source, below the receiver array.

Maximum offsets that are illuminated by the steered virtual Source versus the two-way travel time.

Virtual shot record generated by combined force sources with an assigned amplitude radiation pattern compared with the Ground Truth response convolved with the desired radiation pattern.

METHOD OF CORRECTING AMPLITUDES IN VIRTUAL SOURCE IMAGING OF SEISMIC DATA

RELATED APPLICATIONS

The present application claims priority to International Application PCT/US2009/030552, filed on 9 Jan. 2009, which claims priority to U.S. application Ser. No. 61/010,897, filed on 11 Jan. 2008 which is incorporated herein in its entirety.

FIELD OF THE INVENTION

The invention relates to systems and methods imaging seismic data recorded using at least one seismic source and a set of seismic receivers. More particularly, the invention relates to the use of processing steps to correct amplitude measurements in the context of virtual source imaging.

BACKGROUND OF THE INVENTION

As described in U.S. Pat. No. 6,747,915, a seismic image of an earth formation can be obtained using at least one seismic source and at least one seismic receiver. The source generates a seismic wave into the earth formation, in which formation the seismic wave is reflected by acoustic-impedance contrasts and refracted through media having a variable velocity. The reflected wave is received by the seismic receiver(s). A receiver detects the reflected wave and records it in the form of a signal or seismic trace. The receivers record one signal per receiver and the signals or traces are compiled to yield the seismic image of the underground formation.

In order to avoid the need to place seismic sources in the formation, the '915 patent discloses using an array of sources at the surface in conjunction with multiple receivers in the formation and manipulating the signals in such a way that it appears as if the seismic waves originate from a source at the location of a selected receiver. Such a source is called a virtual source, to distinguish it from a real source, which can be located at the other side of a complex transmission medium i.e. the intervening formation.

It has been found, however, in practice, because there is only finite number of sources, inhomogeneous radiation of the virtual sources results in incorrect measurement of the signal amplitudes. Thus, it is desirable to provide a technique that is capable of providing true-amplitude imaging in a virtual source context, even in inhomogeneous media.

SUMMARY OF THE INVENTION

In accordance with preferred embodiments of the invention there is provided a technique that is capable of providing true-amplitude imaging in a virtual source context, even in inhomogeneous media.

Virtual source data can be corrected for imperfect illumination of the receiver array, which causes the imperfect amplitude retrieval, with or without the presence of lateral invariance in the intervening media. The present techniques can be applied to Virtual Source data that is generated by vertical force sources, horizontal force sources, or combined vertical and horizontal force sources. In addition, the present techniques can be used to "steer" or orient a virtual source in a desired direction. For a limited aperture and frequency range, perfect amplitude retrieval can be achieved in a laterally invariant medium if both horizontal and vertical force sources are present.

In some embodiments, the invention comprises a method for imaging a subsurface formation using at least two seismic sources and at least two seismic receivers, including the steps of a) activating each seismic source so as to excite the subsurface formation and create a wave field and, for each source, obtaining a set of seismic records for each receiver;

b) performing a wave field separation on the set of seismic records obtained in step a) so as to obtain a set of direction-sensitive responses, including a downgoing wavefield, from each receiver;

c) obtaining a virtual source signal for at least a first selected receiver k by cross-correlating at least part of the response of a second selected receiver m with at least part of the response of the first selected receiver k and summing the cross-correlated responses from the at least two sources, so that receiver k becomes a virtual source;

d) for each receiver that becomes a virtual source, estimating an amplitude radiation pattern for that virtual source by performing a time-spatial transform of data based on the downgoing wavefield;

e) deconvolving at least one virtual source signal with at least part of the estimated radiation pattern for that receiver so as to produce an amplitude-corrected virtual source signal having amplitudes that correspond to more a homogeneous amplitude radiation pattern; and f) using the amplitude-corrected virtual source signal produced in step e) to create an image of the subsurface formation.

The present methods can be performed without altering the phase response of the spatially transformed data. The receiver array may be substantially horizontal or tilted. The method may further include a step of autocorrelating the downgoing wave field performing the transform on the autocorrelated downgoing wave field. The method may include using a time gate to select the part of the response of the first selected receiver k. The transform may be a multidimensional Fourier transform, multidimensional Wigner transform, or other suitable transform. The method can be used with one or more types of source, including sources selected from the group consisting of vertical vibrators, horizontal vibrators, and explosions. Multiple source types are particularly preferred if the estimated radiation pattern is not within the desired range. If desired, the method may include selecting a part of the estimated radiation pattern so as to include only a desired portion of the wave field.

BRIEF DESCRIPTION OF THE DRAWINGS

For a more detailed understanding of the invention, reference is made to the accompanying wherein.

DETAILED DESCRIPTION OF A PREFERRED EMBODIMENT

In a typical imaging setup, an array of sources is placed at the surface and an array of receivers is located in a horizontal borehole at depth. As is known, virtual source technology can retrieve seismic reflections as if a source was present at one of the receiver locations. A "ground truth" is defined as the response of an equivalent active source at the virtual source location with all heterogeneities above the receiver array being removed. In practice, when a finite number of sources are used, it has been observed that variations in the formation result in imperfect amplitude retrieval. The present invention greatly increases the accuracy of the amplitude data.

Figure 1:
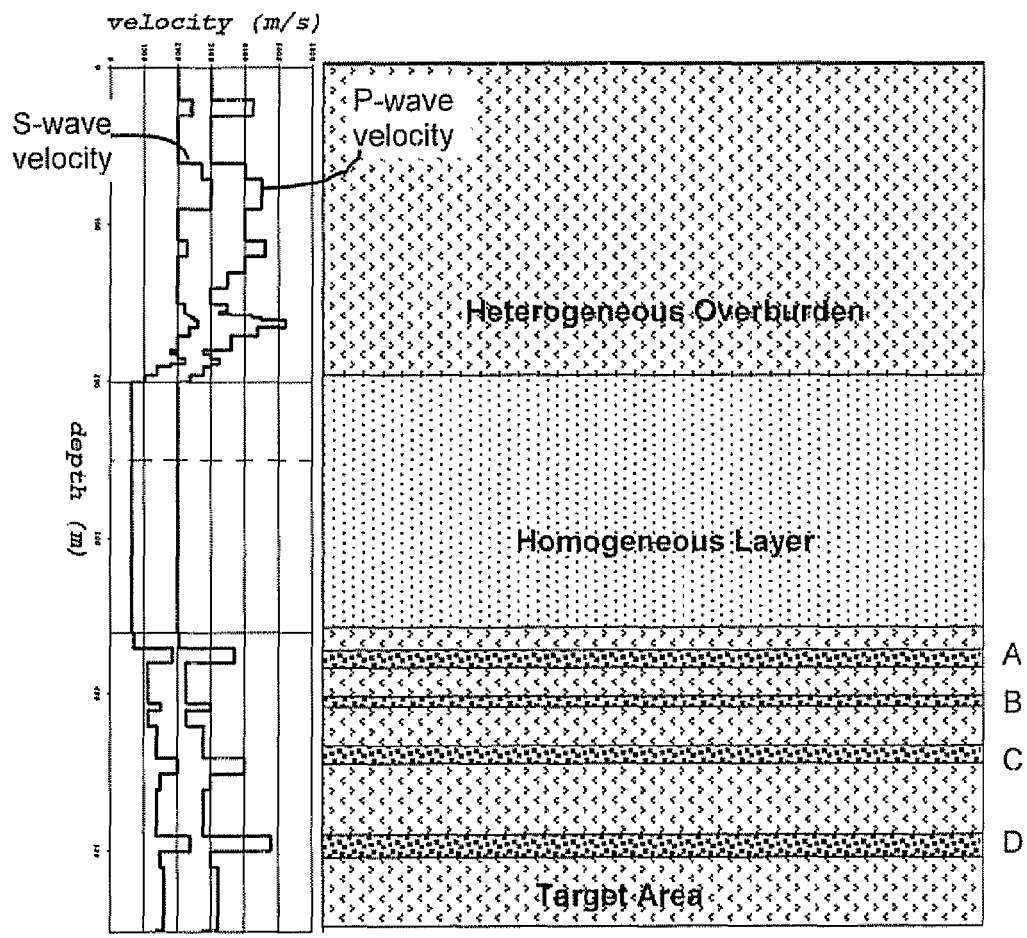
FIG. 1 is a schematic diagram of a hypothetical formation, namely a Fahud 1D model with a laterally homogeneous overburden.

It is helpful to use a model system to demonstrate the efficacy of the present techniques. The model selected for that purpose in the present discussion is a Fahud 1D model, which is a laterally invariant model that is known in the art. A Fahud 1D model system is illustrated in FIG. 1.

Figure 2:
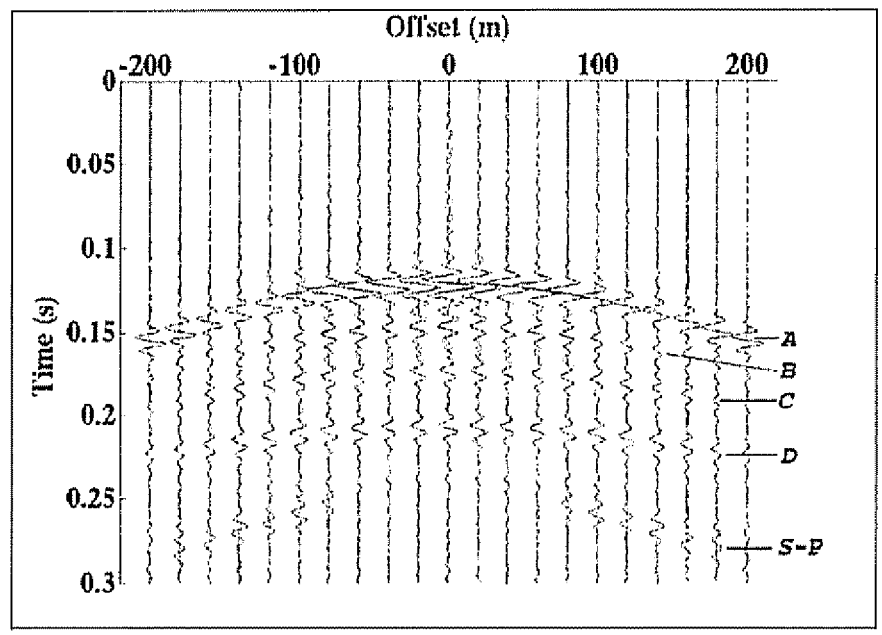
FIG. 2 is a plot of a virtual shot record generated by raw cross-correlations of the up- and downgoing wave fields compared with the ground truth response; reflectors A, B, C, and D are indicated, as is the S-P converted wave that is present in the ground truth response.

It is known to apply the Virtual Source method to this particular geometry by cross-correlating the downgoing wave field at the Virtual Source location with the upgoing wave fields at the other receiver locations, yielding a plot such as the one shown in FIG. 2. The wave fields created by vertical force sources are recorded by hydrophones and geophones. Dual-sensor summation is applied to separate the up- and downgoing P-wave fields. Both Virtual Source data obtained in this manner, without any additional time gating applied, and the ground truth response, with all heterogeneities above the receiver array removed, match kinematically, with the exception of the S-P converted waves in the ground truth but the measured amplitudes are distorted. The present technique reduces the distortion, allowing optimization of the amplitude recovery.

According to preferred embodiments, data from the array of sensors is Fourier transformed over both time and the horizontal coordinate $x_1$. Exemplary Fourier transforms are defined below, along with the parameter settings as used for the Fahud 1D model to avoid spatial and temporal aliasing. Comparing the amplitude FK-representation of the central virtual shot record with the amplitude FK-representation of the Ground Truth reveals that certain wavenumbers and frequencies have different magnitudes, corresponding to different degrees of illumination.

Fourier Transformations

This section gives a formal definition of exemplary Fourier transformations that are used in the exemplary methods described below. It will be understood that other transforms could be used to achieve the objectives described herein.

Temporal Fourier Transforms

The temporal Fourier transform is defined by Wapenaar and Berkhout (1989) as $$\hat{h}(x_1, x_3; \omega) = \int_{-\infty}^{+\infty} h(x_1, x_3; t)\exp(-i\omega t)dt, \tag{1}$$

where $\omega$ is the angular frequency. Note that the sign convention is slightly different from most textbooks. The hat bar indicates that the data lives in the $(x_1,x_3;\omega)$-domain, or simply frequency domain. The straightforward inverse Fourier transform would be $$h(x_1, x_3; t) = \frac{1}{2\pi}\int_{-\infty}^{+\infty} \hat{h}(x_1, x_3; \omega)\exp(i\omega t)d\omega. \tag{2}$$

However, equation (2) would require definition of positive as well as negative frequencies. Since the original signal $h(x_1, x_3;t)$ is real-valued, the frequency domain representation $\hat{h}(x_1,x_3;\omega)$ will be symmetric, allowing equation (I.2) to be rewritten as $$h(x_1, x_3; t) = \frac{1}{\pi}\Re\left\{\int_0^{+\infty} \hat{h}(x_1, x_3; \omega)\exp(i\omega t)d\omega\right\}, \tag{3}$$

which will be used for practical inverse transformations. The discrete character of the data limits the maximal frequency that can be extracted from the data without encountering aliasing. This maximum frequency is dictated by the Nyquist frequency $\omega^{NYQ}$, reading $$\omega^{NYQ} = \frac{\pi}{\Delta t}. \tag{4}$$

Similarly, the final length of the record $t^{MAX}$ imposes a criterion on the maximal resolution that can be obtained in the frequency domain. The minimal frequency sampling that can be retrieved can be determined with a comparable Nyquist relation:

$$\Delta\omega^{NYQ} = \frac{\pi}{t^{MAX}}. \tag{5}$$

For practical display frequency f, relating to the angular frequency, is defined as $\omega=2\pi f$.

Spatial Fourier Transforms

Next a spatial Fourier transform is defined, following Wapenaar and Berkhout (1989):

$$\tilde{h}(k_1, x_3; \omega) = \int_{-\infty}^{+\infty} \hat{h}(x_1, x_3; \omega)\exp(ik_1 x_1)dx_1, \tag{6}$$

where $k_1$ is the horizontal wavenumber. The wiggle bar indicates that a function lives in the $(k_1,x_3;\omega)$-domain, or simply the FK-domain. The inverse of equation (6) can be obtained through the inverse spatial Fourier transform $$\tilde{h}(x_1, x_3; \omega) = \frac{1}{2\pi} \int_{-\infty}^{+\infty} \tilde{h}(k_1, x_3; \omega) \exp(-ik_1 x) dk_1. \quad (7)$$

Again here the discrete character of the data poses a problem on the maximum horizontal wavenumber that can be extracted from the data, as dictated by the Nyquist wave number:

$$k_1^{NYQ} = \frac{\pi}{\Delta x}. \quad (8)$$

The finite receiver aperture limits our resolution in the FK-domain, described by a similar Nyquist criterion:

$$\Delta k_1^{NYQ} = \frac{\pi}{x^{MAX}}. \quad (9)$$

Parameter Settings

The Fourier transformations are optimized by assigning idealistic values to the required parameters. In the Fahud 1D model we have seismic records of 1 s with a 1 ms time sampling. This yields a Nyquist frequency of $\omega^{NYQ}=1000\pi$ or $f^{NYQ}=500$ Hz. However our data has a maximum frequency content of 200 Hz. That is why we do not require frequencies beyond 200 Hz and are safe from temporal aliasing. The limited length of our time records determines our resolution in the frequency domain. We find as minimal frequency sampling from the Nyquist criterion: $\Delta\omega^{NYQ}=\pi m^{-1}$ or $\Delta f^{NYQ}=0.5$ Hz. We use this frequency sampling for the Fahud 1D model, bringing us to 401 frequency samples, ranging from f=0 Hz to f=200 Hz with a $\Delta f=0.5$ Hz sampling interval.

The spatial sampling of 5 m in the Fahud 1D model allows a safe computation of spatial wavenumbers up to $k_1^{NYQ}=0.2$ $\pi m^{-1}$. The minimal sampling is governed by the largest offset in the shot records being 2000 meter, resulting in a minimal wavenumber spacing of $\Delta k^{NYQ}=0.0005\ \pi m^{-1}$. Based on these criteria, we define the horizontal wave number axis to have 401 samples, reaching from $k_1=-0.1\ \pi m^{-1}$ to $k_1=+0.1\ \pi m^{-1}$ with a sampling of $\Delta k_1=0.0005\ \pi m^{-1}$.

In the Peace River 2D model discussed below, the frequencies are also band limited between 0 and 200 Hz. With the 1 ms sampling the Nyquist frequency is once again $f^{NYQ}=500$ Hz, avoiding temporal aliasing. The length of the gather is 0.7 seconds, yielding a maximal spacing of $\Delta\omega^{NYQ}=\pi/0.7$ or $\Delta f^{NYQ}\approx 0.7$ Hz. To be safe, we select a sampling of $\Delta f=0.5$ Hz, creating 401 frequency samples, ranging from f=0 Hz to f=200 Hz.

The spatial sampling in the Peace River 2D model is 10 m, meaning that spatial wavenumbers up to $k_1^{NYQ}=0.1\ \pi m^{-1}$ can be 'safely' retrieved. Due to the limited receiver array of 81 receivers (meaning a maximum offset of 800 m), we loose resolution and find a maximal spatial wavenumber spacing of $\Delta k_1^{NYQ}=0.00125\ \pi m^{-1}$. This yields 161 spatial frequency samples, ranging from $k_1=-0.1\ \pi m^{-1}$ to $k_1=+0.1\ \pi m^{-1}$ with a sampling of $\Delta k_1=0.00125\ \pi m^{-1}$.

Wave Field Separation

The representations in the FK-domain also allow optimization of the preferred wave-field separation method. This section describes methods that can be used for wave field separation in Virtual Source Technology. More specifically, this section gives a derivation of how a perfect separation of all up- and downgoing P- and S-wave fields can be obtained if sensors of horizontal and vertical particle velocity, as well as shear and normal stress are present. In a realistic survey the shear stress will not be measurable, and dual-sensor summation will be a good practical alternative, as pointed out by Mehta et al. (2007). We have observed, however, that the classic dual-sensor summation can be optimized in the FK-domain, yielding a dual-sensor technique that separates all up- and downgoing P-waves exactly, although S-waves will still "leak" into the separated P-wave gathers. With the given formulas, this leakage can easily be quantified.

The first subsection below describes general elastic wave field decomposition in the FK-domain into wave potentials, assuming that all particle velocities and tractions of the wave field could be observed. The second subsection shows how the original quantities, being particle velocities and tractions, can be recomposed from the wave potentials, after the wave field has been separated, allowing computation of all wave field quantities of the down- or upgoing P- or S-wave fields separately. The third subsection shows how the method can be approximated if only two sensors are available, namely the vertical particle velocity (through a vertical geophone) and normal traction (through a hydrophone). Results are compared with conventional dual sensor summation and show slight improvement. In the modified approach exact separation of down- and upgoing P-waves was achieved, although some contaminations were left as induced by S-waves.

Elastic Decomposition

Wapenaar and Berkhout (1989) showed how a wave field can be decomposed into down and upgoing P- and S-wave potentials. If we evaluate their equation (IV-32) in a 2D isotropic medium, we can extract the following expression:

$$\tilde{\Phi}^{\pm} = C_{\Phi V}(\tilde{v}_3, \tilde{\tau}_{33}) + C_{\Phi H}(\tilde{v}_1, \tilde{\tau}_{13})\frac{\beta k_1}{\omega}. \quad (10)$$

Here $\tilde{\Phi}$ is the P-wave potential, the plus sign superscript denotes downgoing and the minus sign superscript denotes upgoing, $\beta$ is the S-wave velocity, $k_1$ the horizontal wave number and $\omega$ is the angular frequency. Quantity $C_{\Phi V}(\tilde{v}_3, \tilde{\tau}_{33})$ corresponds to the interaction of $\tilde{v}_3$ and $\tilde{\tau}_{33}$, according to $$C_{\Phi V} = \pm \frac{1 - 2\beta^2 k_1^2/\omega^2}{\sqrt{1 - \alpha^2 k_1^2/\omega^2}} \frac{\rho\alpha}{2} \tilde{v}_3 - \frac{1}{2}\tilde{\tau}_{33}. \quad (11)$$

This quantity will be the major contribution close to normal incidence and therefore we will refer to it as the near-offset term. Quantity $C_{\Phi H}(\tilde{v}_1, \tilde{\tau}_{13})$ has its weights proportional to $k_1$ and will be referred to as the far-offset correction term. It corresponds to the interaction between $\tilde{v}_1$ and $\tilde{\tau}_{13}$ according to $$C_{\Phi H} = \rho\beta\tilde{v}_1 \mp \frac{1}{2}\frac{\alpha}{\beta}\frac{1}{\sqrt{1 - \alpha^2 k_1^2/\omega^2}}\tilde{\tau}_{13}. \quad (12)$$

Note that no approximations have been made so far.

Up- and downgoing S-waves can be extracted from the data in a similar fashion. We extract from the same matrix expression (IV-32) by Wapenaar and Berkhout (1989) that $$\tilde{\Psi}^{\pm} = C_{\Psi H}(\tilde{v}_1, \tilde{\tau}_{13}) + C_{\Psi V}(\tilde{v}_3, \tilde{\tau}_{33}) \frac{\beta k_1}{\omega}. \tag{13}$$

Here $\tilde{\Psi}$ is the S-wave potential, the plus sign superscript denotes downgoing and the minus sign superscript denotes upgoing. The near-offset term can be written as $$C_{\Psi H}(\tilde{v}_1, \tilde{\tau}_{13}) = \mp \left( \frac{1 - 2\beta^2 k_1^2/\omega^2}{\sqrt{1 - \beta^2 k_1^2/\omega^2}} \right) \frac{\rho \beta}{2} \tilde{v}_1 + \frac{1}{2} \tilde{\tau}_{13}, \tag{14}$$

whereas, for the far-offset correction term:

$$C_{\Psi V}(\tilde{v}_3, \tilde{\tau}_{33}) = \rho \beta \tilde{v}_3 \mp \frac{1}{2} \frac{1}{\sqrt{1 - \beta^2 k_1^2/\omega^2}} \tilde{\tau}_{33}. \tag{15}$$

Unfortunately the expression (14) at near offsets depends on $\tilde{\tau}_{13}$, which is generally not available in realistic cases. Up/down separation of S-waves in this way will therefore be cumbersome with the current state-of-art technology.

Elastic Recomposition

The individual down- or up-going P- or S-wave fields can be treated individually and reprojected onto the observable quantities $\tilde{v}_1, \tilde{v}_3, \tilde{\tau}_{13}$ and $\tilde{\tau}_{33}$ to visualize a separate part of the wave field. These projections can be made by setting all but one of the wave potentials to zero and using the following recomposition expressions that were extracted from equation (IV-32) of Wapenaar and Berkhout (1989):

$$\tilde{v}_1 = \frac{k_1}{\omega \rho}(\Phi^+ + \Phi^-) - \frac{1}{\rho \beta}\sqrt{1 - \beta^2 k_1^2/\omega^2} \, (\Psi^+ - \Psi^-), \tag{16}$$

$$\tilde{v}_3 = \frac{1}{\rho \alpha}\sqrt{1 - \alpha^2 k_1^2/\omega^2} \, (\Phi^+ - \Phi^-) + \frac{k_1}{\omega \rho}(\Psi^+ + \Psi^-), \tag{17}$$

$$\tilde{\tau}_{13} = \tag{18}$$
$$-2\frac{\beta}{\alpha}\sqrt{1 - \alpha^2 k_1^2/\omega^2} \, \frac{\beta k_1}{\omega}(\Phi^+ - \Phi^-) + (1 - 2\beta^2 k_1^2/\omega^2)(\Psi^+ + \Psi^-),$$

$$\tilde{\tau}_{33} = -(1 - 2\beta^2 k_1^2/\omega^2)(\Phi^+ + \Phi^-) - 2\sqrt{1 - \beta^2 k_1^2/\omega^2} \, \frac{\beta k_1}{\omega}(\Psi^+ - \Psi^-). \tag{19}$$

Plotting the down- and upgoing P-wave fields projected on the vertical particle velocity versus the results of the OASES (Ocean Acoustics and Seismic Exploration and Synthesis) software package available from Massachusetts Institute of Technology reconstructed in the time domain shows that the elastic decomposition matches the OASES-results to a high level of accuracy.

Dual Sensor Summations

It may be useful to separate the up- and downgoing P-wave field by dual sensor summation. In this section we show how the dual-sensor summation emerges directly from the more general decomposition, when evaluated at near offsets. To derive the dual sensor approximation, the far offset correction term in equation (B.1) is ignored, leaving the following approximation for the up- or downgoing P-wave potential:

$$\Phi_{ap,1}^{\pm} = \pm \frac{1 - 2\beta^2 k_1^2/\omega^2}{\sqrt{1 - \alpha^2 k_1^2/\omega^2}} \frac{\rho \alpha}{2} \tilde{v}_3 - \frac{1}{2} \tilde{\tau}_{33}. \tag{20}$$

Substituting the expressions (17) and (19) for $\tilde{v}_3$ and $\tilde{\tau}_{33}$ into equation (20) we find that $$\Phi_{ap,1}^{\pm} = (1 - 2\beta^2 k_1^2/\omega^2)\Phi^{\pm} + \frac{\sqrt{1 - \beta^2 k_1^2/\omega^2}}{2} \frac{\beta k_1}{\omega}(\Psi^+ - \Psi^-) \pm \tag{21}$$
$$\frac{(1 - 2\beta^2 k_1^2/\omega^2)}{2\sqrt{1 - \alpha^2 k_1^2/\omega^2}} \frac{\alpha k_1}{\omega}(\Psi^+ + \Psi^-).$$

It is apparent from this representation that no spurious downgoing P-wave will emerge in the extracted upgoing P-wave field and no spurious upgoing P-wave will emerge in the extracted downgoing P-wave field. With dual sensors we can thus still obtain an exact separation with respect to a pure P-wave field. Correction is only required for the $(1-2\beta^2 k_1^2/\omega^2)$-term appearing in equation (21) in order to retrieve the P-wave amplitudes correctly.

At non-normal incidence, the dual sensor results will be contaminated with S-waves. In particular the downgoing S-wave contamination is clearly visible in dual sensor separated shot records at larger offsets. Mehta et al. (2007) have showed that these S-wave contaminations do not pose a problem for the Virtual Source Method in the range of angles at stake in the Fahud 1D model.

By performing a Taylor expansion on equation (20) we find:

$$\Phi_{ap,1}^{\pm} = \left[ \pm \frac{\rho \alpha}{2} \tilde{v}_3 - \frac{1}{2} \tilde{\tau}_{33} \right] \mp \left[ \left(2\beta^2 + \frac{1}{2}\alpha^2\right)\tilde{v}_3 \right] \frac{k_1^2}{\omega^2} + \ldots . \tag{22}$$

If we ignore the higher order terms we get to the following approximation:

$$\Phi_{ap,2}^{\pm} = \pm \frac{\rho \alpha}{2} \tilde{v}_3 - \frac{1}{2} \tilde{\tau}_{33}. \tag{23}$$

This is the more conventional dual sensor summation as used by Mehta et al. (2007). It requires no evaluation in the FK-domain and is therefore straightforward to implement. As all neglected terms are of the order $$\frac{k_1^2}{\omega^2}$$

or higher, there is no significant difference between the approximations (20) or (23) at near offsets. When the results of approximation (20) are overlaid with those of expression (23) for the down- and upgoing P-wave field, respectively, only some very small leakage of the downgoing wave field in the latter can be observed.

Theory

Consider the downgoing wave field $D^+(x_1, x_3, t)$ and the upgoing wave field $D^-(x_1, x_3, t)$, both registered at the receiver array, generated by the central shot at the surface. As all reflectors are laterally invariant, the upgoing wave field can be interpreted as a convolution of the downgoing wave field with the reflection response $R(x_1,x_3,t)$ over time $t$ and the lateral coordinate $x_1$. We apply Fourier transformation of the data over $t$ and $x_1$, according to the definitions set out above, and express the (spatial and temporal) convolution as:

$$\tilde{D}^-(k_1,x_3,\omega) = \tilde{R}(k_1,x_3,\omega)\tilde{D}^+(k_1,x_3,\omega), \quad (24)$$

where the tildes indicate that the quantities are given in the $(k_1,x_3,\omega)$-domain. Next we express the data in terms of amplitudes $|\tilde{D}^\pm(k_1,x_3,\omega)|$ and phases $\tilde{\phi}^\pm(k_1,x_3,\omega)$, according to $$\tilde{D}^+(k_1,x_3,\omega) = |\tilde{D}^+(k_1,x_3,\omega)|\exp(i\tilde{\phi}^+(k_1,x_3,\omega)), \quad (25)$$

$$\tilde{D}^-(k_1,x_3,\omega) = |\tilde{D}^-(k_1,x_3,\omega)|\exp(i\tilde{\phi}^-(k_1,x_3,\omega)). \quad (26)$$

Note that we defined our amplitudes and phases, unconventionally, in the FK-domain. This definition will be used throughout this document.

The term $|\tilde{D}^+(k_1,x_3,\omega)|$ can be interpreted as the amplitude illumination pattern of the downgoing wave field at the receiver array, indicating the spatial distribution of the field that will "feed" the Virtual Source. The amplitude illumination pattern for the Fahud 1D model shows angle- and frequency-dependent interference patterns that are caused by the transmission through the finely-layered overburden with large contrasts in elastic parameters.

By substituting the expressions (25) and (26) into expression (24) we find for the amplitude FK-spectrum of the upgoing wave field:

$$|\tilde{D}^-(k_1,x_3,\omega)| = |\tilde{R}(k_1,x_3,\omega)||\tilde{D}^+(k_1,x_3,\omega)|, \quad (27)$$

whereas the phase of the upgoing wave field can be written as:

$$\exp(i\tilde{\phi}^-(k_1,x_3,\omega)) = \exp(i\tilde{\phi}^+(k_1,x_3,\omega) + i\tilde{\phi}^R(k_1,x_3,\omega)). \quad (28)$$

Here we have expressed the reflection response in the FK-domain in terms of amplitude and phase, according to $$\tilde{R}(k_1,x_3,\omega) = |\tilde{R}(k_1,x_3,\omega)|\exp(i\tilde{\phi}^R(k_1,x_3,\omega)). \quad (29)$$

As indicated by equation (27), the amplitude FK-spectrum of the upgoing wave field $|\tilde{D}^-(k_1,x_3,\omega)|$ can be interpreted as a spatial and temporal convolution of the amplitude FK-spectrum of the downgoing wave field with the amplitude FK-spectrum of the reflection response.

Since the overburden of the Ground Truth is homogeneous, this response is purely upgoing and can be described as $|\tilde{D}_{GT}^-(k_1,x_3,\omega)| = |\tilde{D}_{GT}^-(k_1,x_3,\omega)|\exp(i\tilde{\phi}_{GT}^-(k_1,x_3,\omega))$. The source of the Ground Truth can be seen as a downgoing wave field in the receiver array that we define as $|\tilde{D}_{GT}^+(k_1,x_3,\omega)| = |\tilde{D}_{GT}^+(k_1,x_3,\omega)|\exp(i\tilde{\phi}_{GT}^+(k_1,x_3,\omega))$. The Ground Truth response can be interpreted as a temporal and spatial deconvolution of its downgoing source with the reflection response $\tilde{R}(k_1,x_3,\omega)$. This means in terms of amplitudes:

$$|\tilde{D}_{GT}^-(k_1,x_3,\omega)| = |\tilde{D}_{GT}^+(k_1,x_3,\omega)||\tilde{R}(k_1,x_3,\omega), \quad (30)$$

and in terms of phase:

$$\exp(i\tilde{\phi}_{GT}^-(k_1,x_3,\omega)) = \exp(i\tilde{\phi}_{GT}^+(k_1,x_3,\omega) + i\tilde{\phi}^R(k_1,x_3,\omega)). \quad (31)$$

To compute $|\tilde{D}_{GT}^+(k_1,x_3,\omega)|$, we place the vertical force source in a homogeneous medium and generate the (far field) amplitude radiation pattern at 250 meter. We find a peak frequency of 100 Hz that is most dominant at normal incidence ($k_1/f = 0$), and decays with either frequency (f) or angle (proportional to $k_1/f$) away from the maximum.

The theory we have derived thus far can be validated by performing the following experiment. Convolve the amplitude FK-spectrum of the ground truth response $|\tilde{D}_{GT}^-(k_1,x_3,\omega)|$ with the amplitude FK-spectrum of the downgoing wave field of the data as generated by an array of vertical force sources at the surface $|\tilde{D}^+(k_1,x_3,\omega)|$. From equation (30) we can verify that the amplitude response of this operation is given by:

$$|\tilde{D}^+(k_1,x_3,\omega)||\tilde{D}_{GT}^-(k_1,x_3,\omega)| = |\tilde{D}^+(k_1,x_3,\omega)||\tilde{D}_{GT}^+(k_1,x_3,\omega)||\tilde{R}(k_1,x_3,\omega)|. \quad (32)$$

Similarly, convolving the amplitude FK-spectrum of the upgoing wave field of the data as generated by an array of vertical force sources at the surface $|\tilde{D}^-(k_1,x_3,\omega)|$ with the amplitude radiation pattern of the Ground Truth $|\tilde{D}_{GT}^+(k_1,x_3,\omega)|$; from equation (31) gives $$|\tilde{D}_{GT}^+(k_1,x_3,\omega)||\tilde{D}^-(k_1,x_3,\omega)| = |\tilde{D}^+(k_1,x_3,\omega)||\tilde{D}_{GT}^+(k_1,x_3,\omega)||\tilde{R}(k_1,x_3,\omega)|. \quad (33)$$

Note that both right-hand sides of equations (32) and (33) are similar. In other words, the left-hand side quantities should be the same:

$$|\tilde{D}^+(k_1,x_3,\omega)||\tilde{D}_{GT}^-(k_1,x_3,\omega)| = |\tilde{D}_{GT}^+(k_1,x_3,\omega)||\tilde{D}^-(k_1,x_3,\omega)|. \quad (34)$$

Plots of the left- and the right-hand side of equation (34) respectively show striking similarities.

When creating Virtual Source data, it is preferred to cross-correlate the upgoing wave field at receiver location $x_{1,R}$ with the down-going wave field at Virtual Source location $x_{1,VS}$, followed by a summation over real source positions $x_{1,S}$. In the examples discussed below no additional time gating has been applied. Since the medium is laterally invariant, all data sets can be obtained from spatial shifts of the basic shot records in the frequency domain, $\hat{D}^+(x_1,x_3;\omega)$ and $\hat{D}^-(x_1,x_3;\omega)$. We introduce source location $x_{1,S}$, where $x_{1,S}=0$ at the central shot. The Virtual Source Method can now be expressed mathematically in the frequency domain as $$\hat{D}^{VS}(x_{1,R} - x_{1,VS}, x_3; \omega) = \quad (35)$$
$$\sum_{x_{1,S}} \{\hat{D}^+(x_{1,VS} - x_{1,S}, x_3; \omega)\}^* \hat{D}^-(x_{1,R} - x_{1,S}, x_3; \omega).$$

Shifting all data sets with floating variable $x_1$ yields $$\hat{D}^{VS}(x_1 + x_{1,R} - x_{1,VS}, x, x_3; \omega) = \quad (36)$$
$$\sum_{x_S} \{\hat{D}^+(x_1 + x_{1,VS} - x_{1,S}, x_3; \omega)\}^* \hat{D}^-(x_1 + x_{1,R} - x_{1,S}, x_3; \omega).$$

Next, equation (36) is spatially Fourier transformed over $x_1$. Note that all spatial shifts in the frequency domain yield phase shifts in the FK-domain, leaving the amplitude spectrum unaffected. Thus, the only contributions to the amplitude at the right hand side of equation (36) stem from $|\tilde{D}^+(k_1,x_3,\omega)|$ and $|\tilde{D}^-(k_1,x_3,\omega)|$, which are independent of spatial shifting. This allows the FK-transformed data to be written as $$|\tilde{D}^{VS}(k_1,x_3,\omega)| = |\tilde{D}^+(k_1,x_3,\omega)||\tilde{D}^-(k_1,x_3,\omega)|\exp(i\tilde{\phi}^{VS}(k_1,x_3,\omega)). \quad (37)$$

where $\tilde{\phi}^{VS}$ is the phase of the Virtual Source data in the FK-domain. It is expected that the phase of the Virtual Source data $\tilde{\phi}^{VS}$ will approximate the phase of the reflection response $\tilde{\phi}^R$. Taking the amplitude spectrum of equation (37) yields $$|\tilde{D}^{VS}(k_1,x_3,\omega)| = |\tilde{D}^+(k_1,x_3,\omega)||\tilde{D}^-(k_1,x_3,\omega)|. \quad (38)$$

To verify this statement, the convolution product $|\tilde{D}^+(k_1,x_3,\omega)||\tilde{D}^-(k_1,x_3,\omega)|$ can be plotted. The resulting plot has marked similarities with the Virtual Source amplitude spectrum. Substituting expression (27) into expression (38) gives $$|\tilde{D}^{VS}(k_1,x_3,\omega)|=|\tilde{D}^+(k_1,x_3,\omega)|^2|\tilde{R}(k_1,x_3,\omega)|. \tag{39}$$

To create an ideal Virtual Source, the incoming wave field should have a uniform spatial distribution, which is set at $|\tilde{D}^+(k_1,x_3,\omega)|=1$ (or any constant). From equation (39), it can be seen that, for this case, the cross-correlation approach does indeed retrieve the right amplitudes in the FK-domain. However, if the spatial distribution is imperfect, the virtual source will be contaminated with the imprint of $|\tilde{D}^+(k_1,x_3,\omega)|^2$. This will be referred to as the amplitude radiation pattern of the Virtual Source. To validate this, the ground truth response $\tilde{D}_{GT}^-(k_1,x_3,\omega)$ is convolved with the amplitude imprint $|\tilde{D}^+(k_1,x_3,\omega)|^2$. From the foregoing equations, it follows that this should be equal to $$|\tilde{D}^+(k_1,x_3,\omega)|^2\tilde{D}_{GT}^-(k_1,x_3,\omega)=|\tilde{D}^+(k_1,x_3,\omega)|^2|\tilde{D}_{GT}^+(k_1,x_3,\omega)||\tilde{R}(k_1,x_3,\omega)|. \tag{40}$$

Similarly, convolution of the virtual source data $\tilde{D}^{VS}(k_1,x_3,\omega)$ with the amplitude radiation pattern of the ground truth $|\tilde{D}_{GT}^+(k_1,x_3,\omega)|$, yields $$|\tilde{D}_{GT}^+(k_1,x_3,\omega)|\tilde{D}^{VS}(k_1,x_3,\omega)=|\tilde{D}^+(k_1,x_3,\omega)|^2|\tilde{D}_{GT}^+(k_1,x_3,\omega)||\tilde{R}(k_1,x_3,\omega)|. \tag{41}$$

Note that right hand sides of equations (40) and (41) are the same, meaning that the left sides should also be equal:

$$|\tilde{D}^+(k_1,x_3,\omega)|^2\tilde{D}_{GT}^-(k_1,x_3,\omega)=|\tilde{D}_{GT}^+(k_1,x_3,\omega)|\tilde{D}^{VS}(k_1,x_3,\omega). \tag{42}$$

To verify this, $|\tilde{D}^+(k_1,x_3,\omega)|^2\tilde{D}_{GT}^-(k_1,x_3,\omega)$ and $|\tilde{D}_{GT}^+(k_1,x_3,\omega)|\tilde{D}^{VS}(k_1,x_3,\omega)$ are computed and the resulting data sets are transformed back to the time domain. The resulting plots show very good correlation. Essentially, both responses represent the ideal (Ground Truth or Virtual Source) data with an amplitude 'imprint' that is the combination of the Virtual Source amplitude 'imprint' $|\tilde{D}^+(k_1,x_3,\omega)|^2$, which is computed as the autocorrelation of the downgoing wave field, and the Ground Truth amplitude 'imprint' $|\tilde{D}_{GT}^+(k_1,x_3,\omega)|$.

Virtual Source Radiation Correction

In the previous section, the Ground Truth data was manipulated to fit the Virtual Source data and vice versa. In practice, it is preferred to manipulate the Virtual Source data such that it fits the Ground Truth data. For that purpose, the following (temporal and spatial) deconvolution is performed:

$$\tilde{D}^{VS,CORRECTED}(k_1, x_3, \omega) = \frac{\tilde{D}^{VS}(k_1, x_3, \omega)}{|\tilde{D}^+(k_1, x_3, \omega)|^2}. \tag{43}$$

To stabilize the deconvolution algorithm, we introduce stabilization factor $\epsilon^2$, as well as a stabilization filter $|\tilde{D}^{STAB}(k_1,x_3,\omega)|$, where $|\tilde{D}^{STAB}(k_1,x_3,\omega)|=1$ for each $(k_1,\omega)$-sample for which $|\tilde{D}^+(k_1,x_3,\omega)|^2>d$ and $|\tilde{D}^{STAB}(k_1,x_3,\omega)|=(|\tilde{D}^+(k_1,x_3,\omega)|^2/d)^c$ for each $(k_1,\omega)$-sample for which $|\tilde{D}^+(k_1,x_3,\omega)|^2<d$. Scalars d and c can be chosen manually. With stabilization, equation (43) becomes $$\tilde{D}^{VS,CORRECTED}(k_1, x_3, \omega) \approx \frac{|\tilde{D}^{STAB}(k_1, x_3, \omega)|}{|\tilde{D}^+(k_1, x_3, \omega)|^2 + \varepsilon^2} \tilde{D}^{VS}(k_1, x_3, \omega). \tag{44}$$

The following sections illustrate how equation (44) can be used to improve the amplitude retrieval of the Virtual Source method in laterally invariant media. Concurrently, a slight improvement of kinematics is observed, which is probably due to the more uniform spatial distribution that is obtained in the FK-domain.

The preferred approach can be interpreted as a correction for the imperfect amplitude radiation pattern of the Virtual Source created with a limited aperture of (real) sources. First, it is preferred to correct for the imperfect amplitude illumination from above the virtual source location, being equal to $|\tilde{D}^+(k_1,x_3,\omega)|$. Second, the upgoing wave field that is used as the second term in the cross-correlation also has an incorrect illumination, being embedded in $|\tilde{D}^-(k_1,x_3,\omega)|$. However, correcting the virtual source data by $1/(|\tilde{D}^+(k_1,x_3,\omega)||\tilde{D}^-(k_1,x_3,\omega)|)$ would equalize the entire amplitude FK-spectrum of the reflection response that is part of the signal that we want to maintain. To preserve the true amplitude behavior of the target area, we have to correct by $|\tilde{R}(k_1,x_3,\omega)|/(|\tilde{D}^+(k_1,x_3,\omega)||\tilde{D}^-(k_1,x_3,\omega)|)$. From equation (24) it follows that this can be rewritten as a correction by $1/|\tilde{D}^+(k_1,x_3,\omega)|^2$, as derived formally in equation (43).

Comparing this result with deconvolution interferometry, and replacing the complex conjugates in equation (35) with inverses; yields:

$$\hat{D}^{VS,DECON}(x_{1,R} - x_{1,VS}, x_3; \omega) = \sum_{x_S} \{\hat{D}^+(x_{1,VS} - x_{1,S}, x_3; \omega)\}^{-1} \hat{D}^-(x_{1,R} - x_{1,S}, x_3; \omega). \tag{45}$$

By a similar procedure as we discussed for cross-correlation interferometry, we derive that the deconvolution interferometric data can be represented in the FK-domain as $$\tilde{D}^{VS,DECON}(k_1, x_3; \omega) = \frac{|\tilde{D}^-(k_1, x_3; \omega)|}{|\tilde{D}^+(k_1, x_3; \omega)|} \exp(i\tilde{\phi}^{VS,DECON}). \tag{46}$$

By substituting equation (37) into equation (43) corrected Virtual Source data can be rewritten as $$\tilde{D}^{VS,CORRECTED}(k_1, x_3, \omega) = \frac{|\tilde{D}^-(k_1, x_3; \omega)|}{|\tilde{D}^+(k_1, x_3; \omega)|} \exp(i\tilde{\phi}^{VS}(k_1, x_3, \omega)). \tag{47}$$

Note that both the suggested correction (equation (47)) and the deconvolution interferometric approach (equation (46)) yield exactly the same results in terms of amplitudes. Both phase terms $\exp(i\tilde{\phi}^{VS,DECON})$ $\exp(i\tilde{\phi}^{VS})$ originate from the summation of complex exponentials. The only difference is that in the deconvolution approach, some of the exponentials are inverted, whereas they are complex conjugated in the cross-correlation approach. However, if consider the following identity is considered:

$$\{\exp(i\tilde{\phi})\}^*=\exp(-i\tilde{\phi})=\{\exp(i\tilde{\phi})\}^{-1}, \tag{48}$$

it can be seen that all complex conjugates of complex exponentials are essentially the same as the inverses of these complex exponentials. Therefore, $\exp(i\tilde{\phi}^{VS,DECON})=\exp(i\tilde{\phi}^{VS})$, and equations (46) and (47) will lead to similar results.

Amplitude Radiation Correction for Virtual Source Data Generated by Vertical Force Sources First, the amplitude radiation correction is applied to Virtual Source data that is generated by vertical force sources at the surface. The temporal and spatial deconvolution of the Virtual Source amplitude radiation pattern $|\tilde{D}^+(k_1,x_3,\omega)|^2$ by itself, can be performed using the preferred stabilization parameters and the following formulation:

$$\left|\tilde{D}^{RADIATION}(k_1, x_3, \omega)\right| = \frac{\left|\tilde{D}^{STAB}(k_1, x_3, \omega)\right|}{\left|\tilde{D}^+(k_1, x_3, \omega)\right|^2 + \varepsilon^2} \left|\tilde{D}^+(k_1, x_3, \omega)\right|^2. \quad (49)$$

Figure 12:
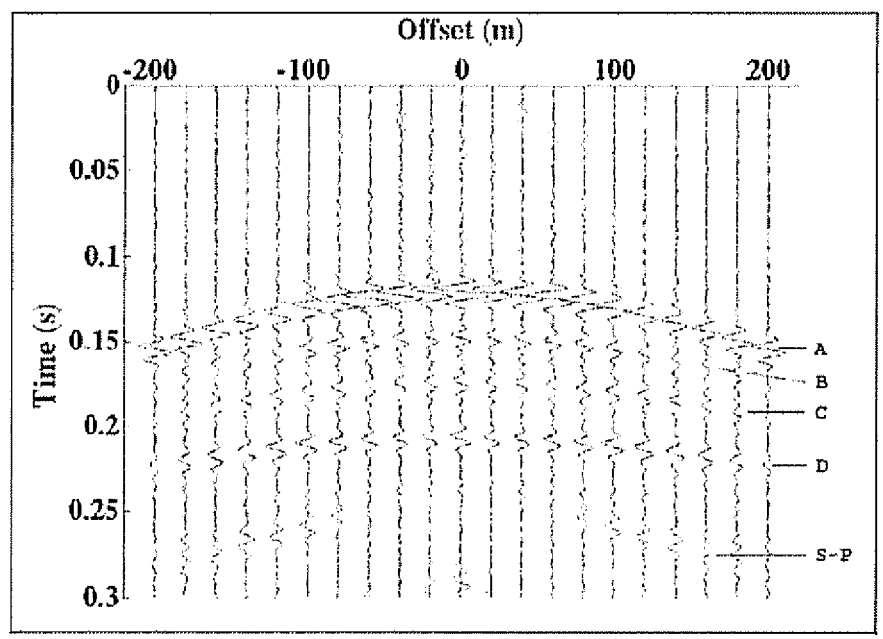
FIG. 12 is a virtual shot record, after amplitude radiation correction compared with the ground truth response.

Quantity $|\tilde{D}^{RADIATION}(k_1,x_3,\omega)|$ can be interpreted as the new amplitude radiation pattern of the Virtual Source, which is now more uniformly distributed in FK-domain. When the result of the amplitude radiation correction on the Virtual Source data (through equation (44)) is plotted, as at FIG. 12, and compared to FIG. 2, it can be seen that that the amplitudes after correction are substantially closer to the Ground Truth response than before correction. Some local peaks still exist due to over-corrections, but they do not pose a problem when the data is transformed back to the time domain. In addition to a better reconstruction of amplitudes, we observe a reduction in some ringing artifacts.

Amplitude Radiation Correction for Virtual Source Data Generated by Horizontal Force Sources If horizontal force sources are used instead of vertical force sources, the Virtual Source method results in slightly more erroneous amplitudes and kinematics. Both the spurious ringing and weak coverage at near offsets can be explained by studying the Virtual Source amplitude radiation pattern, which shows a far from uniform distribution in the FK-domain. By spatial and temporal deconvolution with manually picked stabilization parameters as described herein, this pattern can be improved (e.g. equation (49)). While part of the amplitude radiation FK-spectrum is equalized, there is still no coverage near normal incidence. This is to be expected because no vertical vibrations are generated below the horizontal force source in a layered medium.

After the amplitude radiation correction, the Virtual Source data is improved significantly. The more uniform coverage in the FK-domain reduces spurious ringing effects. While, the near offsets are not properly reconstructed due to the missing normal incidence data, the amplitude retrieval is significantly improved compared to the initial result.

Amplitude Radiation Correction for Virtual Source Data Generated by Combined Force Sources If a combination of vertical and horizontal force sources is available, the amplitude retrieval of the Virtual Source method can be improved even without the amplitude radiation correction. This can be explained by studying the sum of the amplitude radiation patterns. The combined force sources clearly have a more uniform amplitude radiation pattern in the FK-domain than the separate vertical or horizontal force sources.

If amplitude radiation correction is performed on this new data set, the resulting radiation pattern can be very uniform. Amplitude correction can be performed on individual source data, which are then summed, or, alternatively, the source data may be summed and then subjected to amplitude correction. This improved amplitude radiation pattern ensures good amplitude retrieval at a wider range of incidence angles and a reduction of ringing. This was confirmed when the data were plotted and compared to the Ground Truth response, as amplitudes were retrieved with much better accuracy than in the initial results. Note that the very far offsets of reflector A still cannot be correctly recovered, due to the weak coverage of high wavenumbers compared to the Ground Truth radiation.

Steering the Virtual Source

It has been shown that the Virtual Source can be steered by being selective about the shots that are used in the summation (equation (35)). We have now shown that it is also possible to steer the Virtual Source by assigning a user-defined amplitude radiation pattern $|\tilde{D}^A(k_1,x_3,\omega)|$ and performing the following (temporal and spatial) deconvolution operation:

$$\tilde{D}^{VS,STEERED}(k_1, x_3, \omega) = \frac{\left|\tilde{D}^A(k_1, x_3, \omega)\right|}{\left|\tilde{D}^+(k_1, x_3, \omega)\right|^2} \tilde{D}^{VS}(k_1, x_3, \omega). \quad (50)$$

Figure 3:
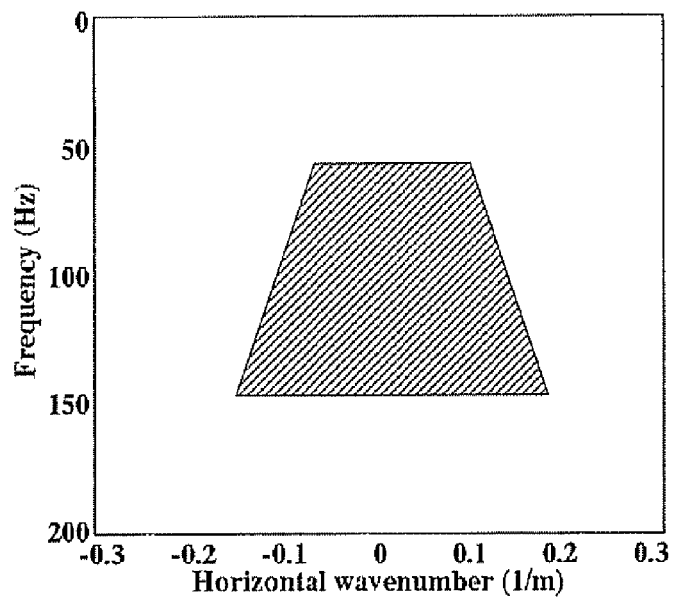
FIG. 3 is a diagram of a desired Virtual Source amplitude radiation pattern.

This can be demonstrated with an example of the Fahud 1D model, where both vertical and horizontal force sources are used. The selected virtual source radiation is has frequencies between 50 and 140 Hz, with a maximum angle of wave radiation of 22° (this angle is chosen as realistic from the amplitude illumination patterns). Accordingly, a desired amplitude radiation pattern $|\tilde{D}^A(k_1,x_3,\omega)|$ can be constructed as shown in FIG. 3.

Figure 4:
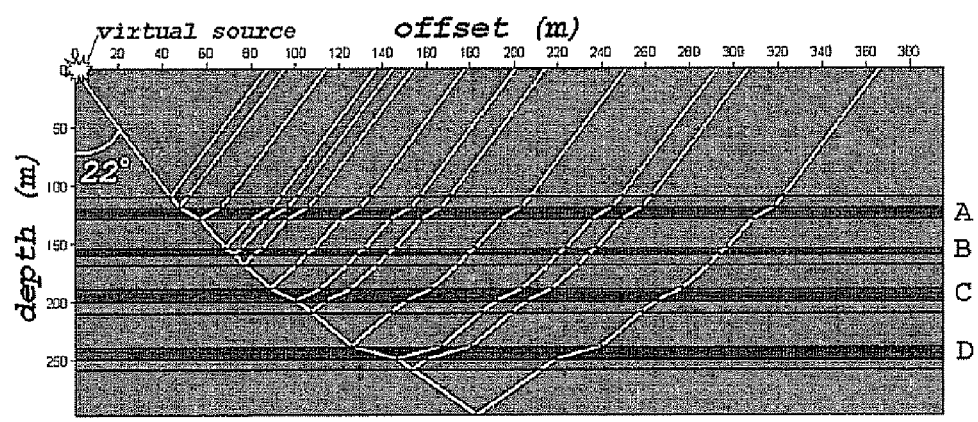
FIG. 4 is a plot illustrating the maximum radiation aperture of a Virtual Source.
Figure 5:
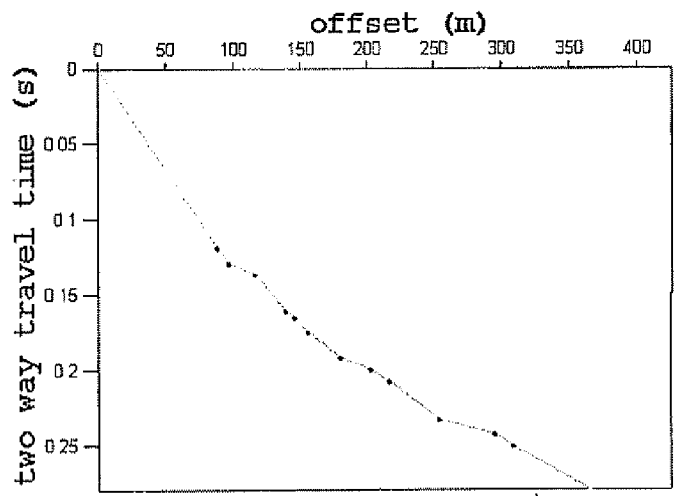
FIG. 5 is a plot illustrating maximum offsets that are illuminated by a Virtual Source versus two-way travel time.

By tracing the rays of the radiation aperture of 22°, we can find the maximum offsets that will be illuminated by the steered Virtual Source for the different reflectors—see FIG. 4. By computing the two-way travel times of these reflections, we can compute the maximum offsets for which correct amplitudes can be retrieved at each depth level, as shown in FIG. 5.

Figure 6:
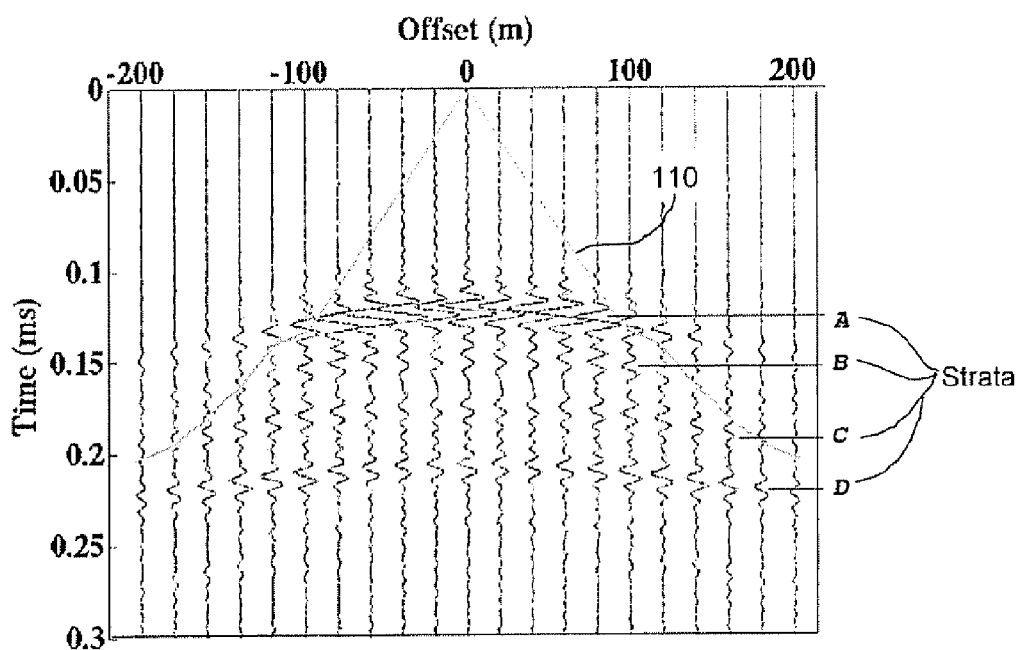
FIG. 6 is a plot showing a virtual shot record generated by combined force sources with an assigned amplitude radiation pattern compared with the Ground Truth response convolved with the desired radiation pattern, where "assigned" means corrected within ranges of angles that are illustrated in FIGS. 3 and 4.

By stabilizing the spatial and temporal deconvolution that establishes the amplitude radiation correction, a very uniform amplitude radiation pattern can be obtained. This becomes apparent when the Virtual Source data is computed in the time domain using equation (50), as shown in FIG. 6, in which line 110 indicates the maximum offsets that are illuminated. The aperture is decreased as compared to the earlier calculation of the Virtual shot record generated by combined force sources after amplitude radiation correction, but the decreased aperture allows near-perfect amplitude retrieval and kinematics within the cone of radiation, which is indicated by line 110. We have thus created a steered Virtual Source that possesses correct amplitudes within its limited aperture.

Virtual Source Amplitude Radiation Pattern in a Generally Inhomogeneous Medium

In laterally varying media, the premises of the previous section are no longer completely valid. In this section we describe a way to estimate the amplitude radiation pattern of the Virtual Source in laterally varying media. This estimate can then be used for diagnostic purposes or for amplitude correction with a temporal and spatial deconvolution algorithm as described in the previous section. The following paragraphs give an outline of the Peace River model, which will provide a basis for testing theory, and show that spatial Fourier transforms are not laterally invariant in heterogeneous media, even for a hypothetical receiver array of infinite extent. However, it is further shown that a stack of these FK-representations over the shot locations yields a spatial distribution that resembles the far-field radiation pattern of a vertical force source. In Virtual Source technology the downgoing wave field at one location is cross-correlated with the total wave field in the entire receiver array. Although the average amplitude illumination pattern in the receiver array resembles the radiation pattern of a vertical force source, the amplitude illumination pattern at a specified Virtual Source location does not.

As discussed in detail below, we can show that the imprint of the illuminating wave field at the Virtual Source location can be estimated by stacking Wigner distribution functions of the individual shots, which in turn can be interpreted as local spatial Fourier transforms. This amplitude illumination pattern will find its way into the radiation of the Virtual Source that is created at that particular location. Also as discussed below, it is possible to optimize the Virtual Source data by temporal and spatial deconvolution with the estimated amplitude radiation pattern, but it is necessary to decrease the radiation aperture of the Virtual Source slightly. Even with a decreased aperture, the improvements are small. Finally, to facilitate practical implementation of both FK and Wigner transforms, the following paragraphs discuss the transforms' sensitivities for receiver spacing and a receiver array of finite-length.

Peace River Elastic Model

Figure 7:
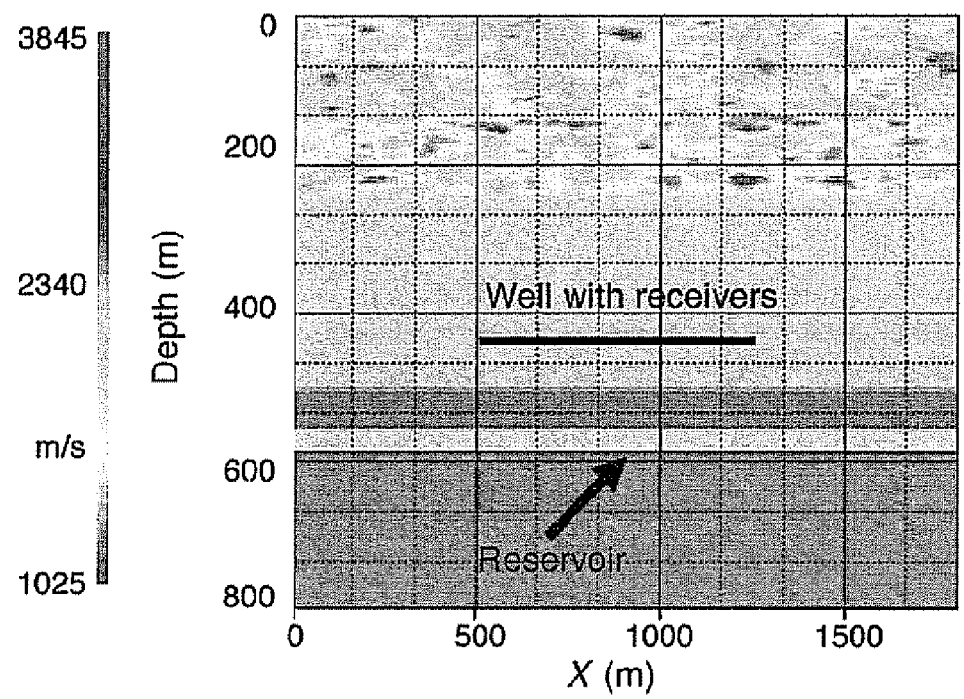
FIGS. 7 and 8 are plots showing P- and S-wave velocities, respectively, in a hypothetical model formation (Peace River) with an inhomogeneous complex overburden.
Figure 8:
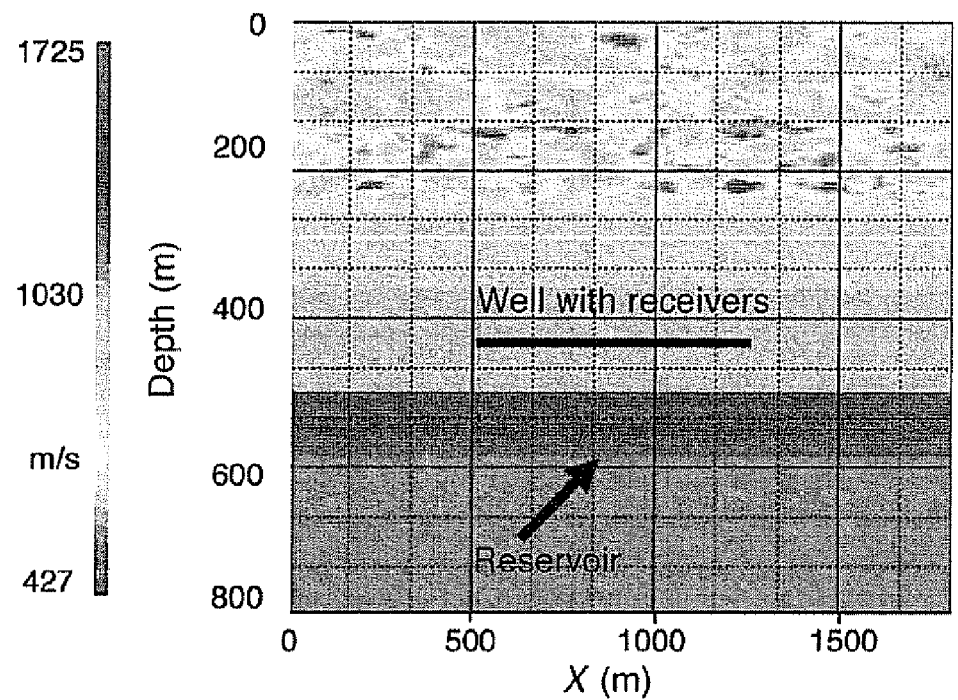
Figure 9:
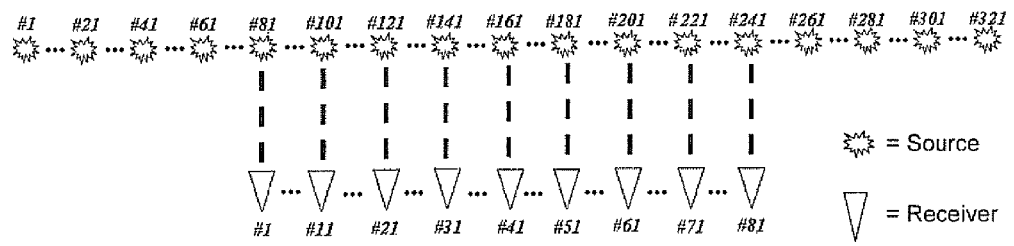
FIG. 9 is a schematic diagram of receiver and source locations as-modeled in conjunction with the Peace River model.

The model consists of 81 receivers in a borehole at 430 m depth, with 10 m spacing, stretching from X=100 m to X=1300 m. Sources are at 15 m depth, with 5 m spacing, covering locations from X=100 m to X=1600 m. The time sampling is 1 ms and there are 700 time samples. The overburden is highly heterogeneous, although the receivers are in a thick homogeneous layer. Below the receivers is a target reservoir. Both reservoir reflectors and receiver array are in a horizontal position. P- and S-wave velocities can be found in FIGS. 7 and 8, respectively. FIG. 9 is a schematic diagram of the receiver and source locations as-modeled.

Figure 10:
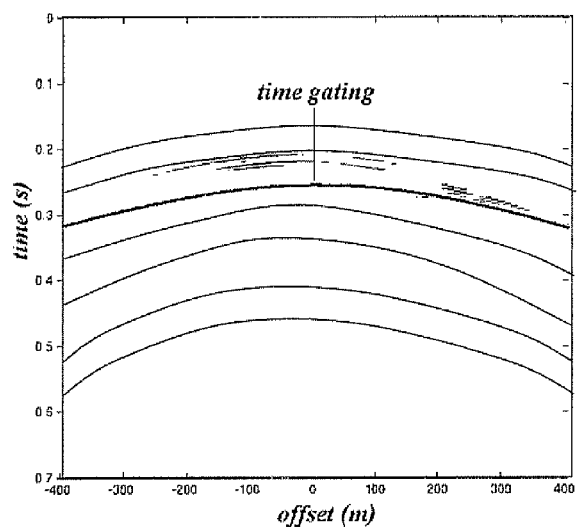
FIG. 10 is an exemplary illustration of the central shot record from a surface source showing a desired time gate.

In this example, only vertical geophone receivers are available, so sophisticated wave field separation cannot be applied and it is necessary to rely on time gating to isolate the major downgoing event. We create a hyperbolic time gate, moving laterally with the shot location. FIG. 10 is an exemplary illustration of the central shot record with a desired time gate.

Straightforward cross-correlations of the time-gated wave field with the total wave field and summing over the shot locations give a good kinematic match with the Ground Truth response, although many artifacts exist in the gather. Here it is preferable to use preprocessed raw data containing only wavenumbers below a certain, desired value for Virtual Source creation, so as to eliminate steeply dipping events, which might cause spatial aliasing in the transforms. Note that all arrivals with time t>0.05 s have been removed, so as to eliminate the strong direct wave in the Ground Truth and the zero-offset peak in the Virtual Source data. We also removed the late arrival times, as the Ground Truth response for those late times is contaminated with reflections from the overburden. It is expected that these undesirable events will be absent from the Virtual Source data due to the applied time gating of the downgoing wave field.

Again, the array of sensors allows the data to be transformed in the FK-domain. A plot of the amplitude FK-spectrum of the Ground Truth, after the late arrivals have been removed shows a strong presence of some high wavenumbers and the clear patterns in the subsurface reflections. Similar patterns can be recognized in the Virtual Source data, although distorted by some spots of over-illumination. The following section describes how these spots also show up in the estimate of the Virtual Source amplitude radiation pattern that is computed from Wigner distribution functions.

Spatial Fourier Transformations of the Downgoing Wave Field

Focusing on the downgoing wave field that 'feeds' the Virtual Source, we compute and plot amplitude spectra of FK-transforms for three shot locations at near offsets with respect to the central receiver (#41): shot #141, right above receiver #31, shot #161, right above the central receiver #41, and shot #181, right above receiver #51. See FIG. 9 for a reference to these locations. It is immediately apparent from these plots that the Fourier transform is no longer independent of the spatial shifts, as it was in the Fahud 1D model. This is due to the inhomogeneity of the overburden. Each shot has different areas of over- and under-illumination, which seem as randomly distributed as the heterogeneities in the overburden itself.

When we move the shot location further away from the central receiver, we face the consequences of the limited aperture of the receiver array. When the amplitude FK-spectra of the source above the first (#1) and last (#81) receiver, respectively, are plotted, it is apparent that the negative wavenumbers are under-illuminated in the former, whereas the positive wavenumbers are under-illuminated in the latter, simply because there are no receivers present to observe this part of the FK-spectrum.

The FK-representations give a sense of the average distribution of each shot over the receiver array, but no specific information on how each individual Virtual Source location is illuminated. If all of the FK-representations of shots #81-#241 are stacked, the resulting plot resembles the far field amplitude radiation pattern of a vertical force source, as computed above. The presence of laterally variant scatterers has increased the diversity in the wave fields that propagate downwards. Apparently, the inference of these patterns over different receiver and shot locations converges towards a fairly symmetric average, which may be an advantage in the creation of Virtual Source data in a heterogeneous medium, as compared to a Virtual Source in the layered earth, where we find the same imprint of the overburden in every shot. However, it is important to keep in mind that every individual Virtual Source can be over- or under-illuminated in certain directions and that a smooth distribution may be only an "average" illumination.

Wigner Distribution Function of the Downgoing Wave Field

As uniform as the average distribution over the receiver array may be, the illumination at a particular receiver is not so uniform. A virtual shot record will thus bear the imprint of the local illumination at the particular Virtual Source location where it is created. To estimate this illumination pattern, we have to introduce a local Fourier transform, unraveling the horizontal wavenumbers at one particular location. Here we use the Wigner distribution function, which is defined as:

$$W(x_1, k_1, x_3; \omega) = \int_{-\infty}^{+\infty} \hat{D}^+\left(x_1 - \frac{1}{2}\xi_1, x_3; \omega\right) \left\{\hat{D}^+\left(x_1 + \frac{1}{2}\xi_1, x_3; \omega\right)\right\}^* \exp(ik_1\xi_1) d\xi_1 \qquad (51)$$

We can recognize $\hat{D}^+(x_1,x_3;\omega)$ as the downgoing wave field in the frequency domain and $\xi_1$ as a spatial shifting variable. The Wigner distribution function creates a local Fourier transform in the $(k_1,x_3;\omega)$-domain at location $x_1$. For our purpose $x_1$ will generally represent the Virtual Source location $x_{1,VS}$. The most optimal position to study is the central Virtual Source (location #41). At that position, there are 40 samples to the right of the virtual Source location and 40 samples to the left. These samples can be used to estimate the Wigner distribution. In the next section, it is shown that using fewer samples decreases the resolution but yields similar results. It is thus possible to repeat the procedure with decreased resolution at different Virtual Source locations.

Localizing the transform results in a concurrent increase of spatial aliasing that equation (51) exhibits, as compared with the conventional spatial Fourier transform. This can be easily explained by the fact that twice as many sample points are required in order to sample each wave number. To illustrate this, equation (51) can be rewritten as $$W(x_1, k_1, x_3; \omega) = \quad (52)$$
$$2\int_{-\infty}^{+\infty} \hat{D}^+(x_1 - \xi'_1, x_3; \omega)\{\hat{D}^+(x_1 + \xi', x_3; \omega)\}^* \exp(i2k_1\xi')d\xi',$$

where $2\zeta=\zeta$. The new Nyquist wavenumber is half as big as the old Nyquist wavenumber due to the factor of two in the exponent. This can be demonstrated by studying some Wigner distribution functions for different shot locations. A comparison of the Wigner distributions for three shot locations, #141, #161 and #181 with the FK-transforms at those locations reveals that the central downgoing wave package that reaches the Virtual Source location moves along with the shot location, and how some scattering is added by the complex overburden. Also note how the aliased event is clearly visible at $k_1 \pm \pi/10$ from the real event. This factor $\pi/10$ is exactly the Nyquist wavenumer for the Wigner function, being half the Nyquist wavenumber of the FK-transform that we calculated above. Moving to the edge of the receiver array reveals aliased events that confuse the result. This problem can be overcome by muting half of the FK-spectrum for shots that are not near the center of the array; they are shots #81-#140 and shots #182-#241. For shots #141-#181, the real event is isolated by removing the outer lobes of the FK-spectrum.

Stacking the shot locations yields a combined amplitude illumination pattern that shows a good match of the over-illuminated spots with the over-illuminated spots in the Virtual Source data. The Wigner distribution function thus seems able to diagnose the illumination pattern that hampers the Virtual Source radiation. It can therefore be used as a tool to visualize the spatial contribution of each shot that is used in the creation of the Virtual Source data.

Amplitude Radiation Correction

Figure 11:
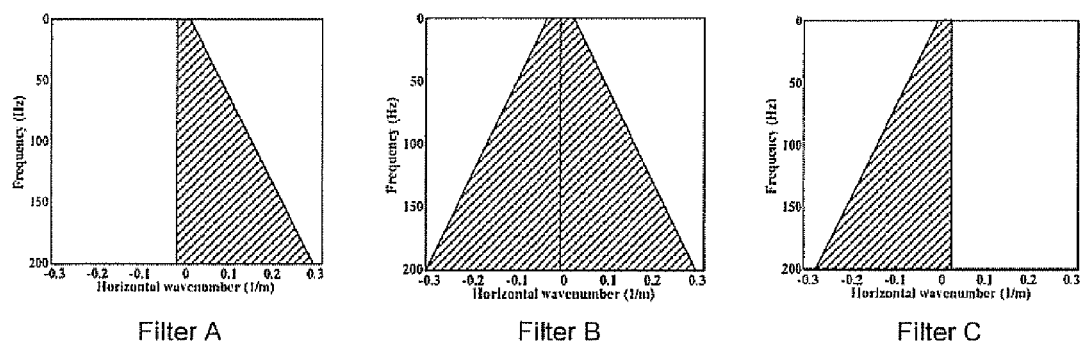
FIG. 11 is a schematic illustration of exemplary F-K filters that can be applied to steer the virtual sources.

A final preferred objective is to eliminate the amplitude radiation pattern from the Virtual Source data as much as possible. However, straightforward temporal and spatial deconvolution of the Virtual Source data with the estimated Virtual Source amplitude radiation pattern is not very fruitful. Some of the error may be attributed to spurious events that result from aliasing artifacts. These appear as near-vertical stripes in the Amplitude FK-spectrum of the virtual shot record. To eliminate these artifacts, FK-filtering can be applied to the shot records prior to the Virtual Source creation. The filters are preferably configured as shown in FIG. 11, namely Filter A is applied to the shot records that are relatively left of the receiver array (#81-#140), Filter B is used for the central shots (#141-#181), and Filter C takes care of the shots on the right (#182-#241). (Shot numbers refer to the configuration shown in FIG. 8). With this procedure, the shots on the left only to contribute to the positive wavenumbers (rightgoing waves), while shots on the right only contribute to the negative wavenumbers (leftgoing waves). Further, all steep events are eliminated; leaving us with a maximum aperture that leaves the Virtual Source with an angle of 35 degrees, comparable with the exemplary steered Virtual Source discussed above (22°).

When the new Virtual Source data computed from the pre-FK-filtered shot records is compared to the Ground Truth (also filtered with Filter B) it becomes apparent that some aperture of Reflector A has been lost due to the filtering, whereas Reflector B is still fully illuminated. The original data is not markedly improved, although some artifacts have been removed. This becomes most clear the data are transferred to the FK-domain, where it becomes apparent that some of the original imprints have been eliminated and that the patterns induced by the target reflectors are more continuous.

The initial estimated Virtual Source radiation pattern can be upgraded to a more uniform distribution in the FK-domain by a temporal and spatial deconvolution algorithm that is comparable with that described above, except that instead of the FK transform, a Wigner transform is used. If amplitude radiation correction is applied to the Virtual Source data, some slight improvements are observed, but the correction is still not optimal.

Practical Implementations

One problem with implementing the proposed transforms and operations is spatial aliasing, which is governed by the spatial sampling and limits the maximum wavenumber for which the FK-spectrum can be correctly retrieved. An FK-spectrum of the central shot (#161), resulting from an array with 20 m receiver spacing instead of the initial 10 m reveals a large portion of data that is spatially aliased, thus hampering analysis in parts of the FK-domain. 20 m spacing would thus be insufficient to apply FK-based methodology on this data set.

For the Wigner distribution function, the case is slightly different. As we discussed above, the Nyquist wavenumber is half that of the FK-transform. However, the transformed data is also more localized, thus simplifying the separation of aliased and unaliased data. A plot of the Wigner distribution function of shot #161 at receiver #41 from data with 20 m receiver spacing shows that even though the amount of aliasing is significantly increased, the real event can still be easily isolated from the aliases. This holds true for shot records other than the central shot record.

Another problem is posed by the limited receiver array. With respect to the FK-transform, an amplitude FK-representation of the central shot record #161, computed from an array of 41 instead of 81 receivers, with receiver #41 as the central receiver and the receiver spacing at 10 m, shows the effects of fewer waves being captured, compared to the initial result. This becomes even clearer if the array is limited to only 21 receivers or only 11 receivers. The resolution decreases significantly, causing blurring of the image. However, a limited receiver array does not hamper an FK-analysis as fundamentally as an increase of the receiver spacing does.

A similar remark can be made about the Wigner distribution function. The Wigner distribution of central shot #161 at central receiver #41 for an array of 41 receivers shows a decrease of resolution as compared to a plot in which the complete array is used. If the length of the receiver array is decreased further to 21 or 11 receivers the FK-transform and the Wigner distribution look more and more alike, simply because the FK-representation will give a more localized image of the spatial distribution.

Discussion

We have shown that, even with a limited receiver array, the Wigner function allows visualization of the illumination at each receiver by an individual shot. This information can be used for radiation correction that aims to restore true amplitudes or to remove amplitude distortions from Virtual Source data generated with a one-sided limited aperture. It is important to note that these operations modify the amplitudes of the data, while leaving the phase information untouched. Although most examples are applied to cases with receivers in a horizontal borehole, the theory could easily be extended to deviated wells.

Further we have shown that perfect amplitudes can be achieved if the Virtual Source is placed in a lateral invariant medium and we limit our radiation aperture to the part of the FK-spectrum that is illuminated. Taken alone, this may be of limited practical use, as most Virtual Source applications are in complex, laterally varying overburdens. However, our work shows that correction of amplitude retrieval by Virtual Source Technology is possible.

Although one objective of the present efforts has to improve amplitude recovery, manipulations in the FK-domain also affect the kinematics. In case of a laterally invariant medium, the proposed correction implicitly eliminates some spurious ringing in the Virtual Source data because the spatial distributions of the wave fields that created the Virtual Source become more uniform in the FK-domain.

By considering the difference between horizontal and vertical force sources in generating Virtual Source data, we have shown that a combination of both source types can yield a more uniform spatial distribution of the illuminating wave field, thus improving both amplitude retrieval and the reduction of spurious ringing. We also showed that our proposed amplitude radiation correction could improve Virtual Source data that is generated by a less-than-ideal source type; for example near-offset virtual P-wave data at depth, generated by solely horizontal force sources at the surface.

In all proposed transformations, it is necessary to have an array of receivers. The length of the array determines the resolution and even for very small arrays the theory can give stable information. The receiver spacing is important, however, as it determines the largest unaliased horizontal wavenumber (or incidence angle) that can be retrieved. For both the Peace River data and the Fahud 1D model, 10 meter receiver spacing proved to be enough for P-wave data, but 20 meter receiver spacing caused severe aliasing. However, we have shown that the Wigner distribution function can still provide an unaliased estimate of the spatial distribution of the downgoing wave field, if it is sufficiently localized enough at the Virtual Source location. The operations can also be applied for retrieval of shear waves or PS-converted waves, although the problem of spatial aliasing may become more pronounced for these scenarios.

Lastly, we have observed a possible connection of our theory with deconvolution interferometry. A spatial and temporal deconvolution algorithm, may implicitly correct for the different amplitude illumination patterns at both receiver locations that are used in the creation of Virtual Source data; as appears to be the case in laterally invariant media.

While the present invention has been described in terms of particular examples and hypothetical situations, it is to be understood that the use of examples and hypothetical data does not limit the claims in any way.

The invention claimed is:

1. A method for imaging a subsurface formation using at least two seismic sources and a set of at least two seismic receivers, the method comprising the steps of:
   a) activating each seismic source so as to excite the subsurface formation and create a wave field and, for each source, obtaining a set of seismic records for each receiver;
   b) performing a wave field separation on the set of seismic records obtained in step a) so as to obtain a set of direction-sensitive responses, including a downgoing wavefield, from each receiver;
   c) obtaining a virtual source signal for at least a first selected receiver k by cross-correlating at least part of the response of a second selected receiver m with at least part of the response of the first selected receiver k and summing the cross-correlated responses from the at least two sources, so that receiver k becomes a virtual source;
   d) for each receiver that becomes a virtual source, estimating an amplitude radiation pattern for that virtual source by performing a time-spatial transform of data based on the downgoing wavefield;
   e) deconvolving at least one virtual source signal with at least part of the estimated radiation pattern for that receiver so as to produce an amplitude-corrected virtual source signal having amplitudes that correspond to more a homogeneous amplitude radiation pattern than the amplitude radiation pattern estimated for that virtual source); and
   f) using the amplitude-corrected virtual source signal produced in step e) to create an image of the subsurface formation.

2. The method according to claim 1 wherein step d) is performed without altering the phase response of the spatially transformed data.

3. The method according to claim 1 wherein the receiver array is not horizontal.

4. The method according to claim 1 further including the step of autocorrelating the downgoing wave field, wherein the transform in step d) is performed on the autocorrelated downgoing wave field.

5. The method according to claim 1 step c) includes using a time gate to select the part of the response of the first selected receiver k.

6. The method according to claim 1 wherein step d) includes using a multidimensional Fourier transform.

7. The method according to claim 1 wherein step d) includes using a multidimensional Wigner transform.

8. The method according to claim 1 wherein step a) includes using at least two types of source.

9. The method according to claim 8 wherein the sources are selected from the group consisting of vertical vibrators, horizontal vibrators, and explosions.

10. The method according to claim 1 wherein step e) includes selecting the part of the estimated radiation pattern so as to include only a desired portion of the wave field.

11. The method according to claim 1, further including a step of determining whether the variation in the estimated radiation pattern is within a desired range and performing steps a) through e) with a different source type if the estimated radiation pattern is not within the desired range.

12. A method for imaging a subsurface formation using at least two seismic sources and a set of at least two seismic receivers, the method comprising the steps of:
   a) activating each seismic source so as to excite the subsurface formation and create a wave field and, for each source, obtaining a set of seismic records for each receiver;
   b) performing a wave field separation on the set of seismic records obtained in step a) so as to obtain a set of direction-sensitive responses, including a downgoing wavefield, from each receiver;
   c) obtaining a virtual source signal for at least a first selected receiver k by cross-correlating at least part of the response of a second selected receiver m with at least part of the response of the first selected receiver k and summing the cross-correlated responses from the at least two sources, so that receiver k becomes a virtual source;
   d) autocorrelating the downgoing wave field;
   e) for each receiver that becomes a virtual source, estimating an amplitude radiation pattern for that virtual source by performing a time-spatial transform of data based on the downgoing wavefield, wherein the transform is performed on the autocorrelated downgoing wave field;

f) deconvolving at least one virtual source signal with at least part of the estimated radiation pattern for that receiver so as to produce an amplitude-corrected virtual source signal having amplitudes that correspond to more a homogeneous amplitude radiation pattern than the amplitude radiation pattern estimated in step e); and g) using the amplitude-corrected virtual source signal produced in step e) to create an image of the subsurface formation.

13. The method according to claim 12 wherein step e) is performed without altering the phase response of the spatially transformed data.

14. The method according to claim 12 wherein the receiver array is not horizontal.

15. The method according to claim 12 wherein step e) includes using a multidimensional Fourier transform.

16. A method for imaging a subsurface formation using at least two seismic sources and a set of at least two seismic receivers, the method comprising the steps of:

a) activating each seismic source so as to excite the subsurface formation and create a wave field and, for each source, obtaining a set of seismic records for each receiver;

b) performing a wave field separation on the set of seismic records obtained in step a) so as to obtain a set of direction-sensitive responses, including a downgoing wavefield, from each receiver;

c) obtaining a virtual source signal for at least a first selected receiver k by cross-correlating at least part of the response of a second selected receiver m with at least part of the response of the first selected receiver k and summing the cross-correlated responses from the at least two sources, so that receiver k becomes a virtual source;

d) for each receiver that becomes a virtual source, estimating an amplitude radiation pattern for that virtual source by performing a time-spatial transform of data based on the downgoing wavefield;

e) selecting the part of the estimated radiation pattern so as to include only a desired portion of the wave field and deconvolving at least one virtual source signal with the selected part of the estimated radiation pattern for that receiver so as to produce an amplitude-corrected virtual source signal having amplitudes that correspond to more a homogeneous amplitude radiation pattern than the amplitude radiation pattern estimated for that virtual source); and f) using the amplitude-corrected virtual source signal produced in step e) to create an image of the subsurface formation.

17. The method according to claim 16, further including a step of determining whether the variation in the estimated radiation pattern is within a desired range and performing steps a) through e) with a different source type if the estimated radiation pattern is not within the desired range.

18. The method according to claim 16 wherein the receiver array is not horizontal.

19. The method according to claim 16 wherein the sources are selected from the group consisting of vertical vibrators, horizontal vibrators, and explosions.

\* \* \* \* \*